United States Patent
Li et al.

(10) Patent No.: US 10,298,600 B2
(45) Date of Patent: May 21, 2019

(54) METHOD, APPARATUS, AND SYSTEM FOR COOPERATIVE DEFENSE ON NETWORK

(71) Applicant: HUAWEI TECHNOLOGIES CO., LTD., Shenzhen, Guangdong (CN)

(72) Inventors: Jinming Li, Beijing (CN); Donghui Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 136 days.

(21) Appl. No.: 14/985,807

(22) Filed: Dec. 31, 2015

(65) Prior Publication Data

US 2016/0119367 A1   Apr. 28, 2016

Related U.S. Application Data

(63) Continuation of application No. PCT/CN2014/081939, filed on Jul. 10, 2014.

(30) Foreign Application Priority Data

Nov. 12, 2013   (CN) .......................... 2013 1 0561435

(51) Int. Cl.
*G06F 17/00*   (2019.01)
*H04L 29/06*   (2006.01)
*H04L 12/64*   (2006.01)

(52) U.S. Cl.
CPC ...... *H04L 63/1416* (2013.01); *H04L 12/6418* (2013.01); *H04L 63/1425* (2013.01); *H04L 63/20* (2013.01)

(58) Field of Classification Search
USPC .......................................................... 726/1
See application file for complete search history.

(56) References Cited

U.S. PATENT DOCUMENTS

| | | | |
|---|---|---|---|
| 2004/0003286 A1* | 1/2004 | Kaler | G06F 21/554 726/25 |
| 2013/0042317 A1 | 2/2013 | Nakashima | |
| 2014/0112150 A1* | 4/2014 | Ko | H04L 47/24 370/236 |

FOREIGN PATENT DOCUMENTS

| | | |
|---|---|---|
| CN | 101335755 A | 12/2008 |
| CN | 101414927 A | 4/2009 |

(Continued)

OTHER PUBLICATIONS

Rodrigo Braga et al: "Lightweight DDoS flooding attack detection using NOX/Open Flow", 35th Annual IEEE conference on local computer networks, Oct. 10, 2010, XP031986806, total 8 pages.

(Continued)

*Primary Examiner* — Brandon S Hoffman
*Assistant Examiner* — Samuel Ambaye
(74) *Attorney, Agent, or Firm* — David William Roe

(57) ABSTRACT

The present disclosure provides a method, an apparatus, and a system for cooperative defense on a network. Alarm information sent by a security device of a first subnet that is being attacked is received by a controller; the controller generates flow table information according to the alarm information, and forwards the flow table information to a switching device of the first subnet and a switching device of at least one second subnet, which is equivalent to that, after detecting an attack, a security device of a subnet generates alarm information, and shares, by using the controller, the alarm information with a switching device of the subnet and a switching device of another subnet that is not being attacked, to form networkwide cooperative defense, thereby enhancing network security.

10 Claims, 6 Drawing Sheets

(56) References Cited

FOREIGN PATENT DOCUMENTS

| | | |
|---|---|---|
| CN | 101938459 A | 1/2011 |
| CN | 101938460 A | 1/2011 |
| CN | 102763382 A | 10/2012 |
| CN | 103051557 A | 4/2013 |
| CN | 103326884 A | 9/2013 |
| WO | 03010938 A1 | 2/2003 |
| WO | 2013041128 A1 | 3/2013 |

OTHER PUBLICATIONS

Tianyi Xing et al: "SnortFlow: A OpenFlow-Based Intrusion Prevention System in Cloud Environment", 2013 second GENI research and educational experiment workshop, Mar. 20, 2013, XP032485524, total 4 pages.

Seugwon Shin et al: "FRESCO: Modular Composable Security Services for Software-Defined Networks", ISOC network and distributed system security symposium (NDSS), Dec. 3, 2012, XP055222147, total 16 pages.

Antonio Gonzalez et al:"An Architecture for Intrusion Prevention using Software Defined Networks", Oct. 3, 2013, XP055278161, total 1 page.

OpenFlow Switch Errata, Version 1.0.2, ONF TS-013, Open Networking Foundation, Nov. 1, 2013, total 12 pages.

Michele Colajanni et al: "Collaborative architecture for malware detection and analysis", Jan. 1, 2008, XP055489371, pp. 79-93.

\* cited by examiner

METHOD, APPARATUS, AND SYSTEM FOR COOPERATIVE DEFENSE ON NETWORK

CROSS-REFERENCE TO RELATED APPLICATIONS

This application is a continuation of International Application No. PCT/CN2014/081939, filed on Jul. 10, 2014, which claims priority to Chinese Patent Application No. 201310561435.9, filed on Nov. 12, 2013, both of which are hereby incorporated by reference in their entireties.

TECHNICAL FIELD

Embodiments of the present disclosure relate to communications technologies, and in particular, to a method, an apparatus, and a system for cooperative defense on a network.

BACKGROUND

A software-defined network (Software Defined Network, hereinafter referred to as SDN) is a network architecture that separates a control plane of a network from a forwarding plane of the network. A controller on the control plane deploys a higher-layer policy, and a network device on the forwarding plane forwards a data flow under guidance of the higher-layer policy, thereby reducing various complex functions carried by the original network device, and improving network flexibility and integrity.

In an existing SDN, a controller uses a preset network defense policy to perform defense against a data flow that is to enter each subnet, that is, the controller uses the preset network defense policy to perform data flow filtering on the data flow before the data flow enters each subnet. Only a filtered data flow can be forwarded to each subnet by using a switch in each subnet, to ensure network security.

However, when network defense is performed by using the method in the prior art, because the controller needs to perform data flow filtering on all data flow that enter subnets, a load of the controller is increased, and processing performance of the controller is reduced.

SUMMARY

Embodiments of the present disclosure provides a method, an apparatus, and a system for cooperative defense on a network and improving processing performance of a controller.

In one embodiment, a method for cooperative defense on a network, is disclosed that includes receiving, by a controller, alarm information sent by a security device of a first subnet, wherein the first subnet is a subnet that is being attacked, and the alarm information comprises feature information of attack information, wherein the controller is part of a network, and the network further comprises a first subnet, and at least one second subnet, and the controller controls the first subnet and the at least one second subnet, generating, by the controller according to the feature information of the attack information, flow table information, and forwarding, by the controller, the flow table information to a switching device of the first subnet and a switching device of the at least one second subnet, so that the switching device of the first subnet and the switching device of the at least one second subnet perform filtering on a data flow according to the flow table information.

In another embodiment, an apparatus for cooperative defense on a network, is disclosed that includes a receiving module, configured to receive alarm information sent by a security device of a first subnet, wherein the first subnet is being attacked, and the alarm information is a feature information of attack information, a processing module, configured to generate flow table information according to the feature information of the attack information, and a sending module, configured to forward the flow table information to a switching device of the first subnet and a switching device of at least one second subnet, so that the switching device of the first subnet and the switching device of the at least one second subnet perform filtering on a data flow according to the flow table information.

In yet another embodiment, an apparatus for cooperative defense on a network, is disclosed that includes a receiving module, configured to receive attack information and a sending module, configured to send alarm information to a controller, wherein the alarm information is a feature information of the attack information, wherein the network comprises the controller, a first subnet, and at least one second subnet, and the controller controls the first subnet and the at least one second subnet.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

A main idea of the technical solutions of the present disclosure is that alarm information reported by a security device of a network that is being attacked is shared with a switching device and/or a security device of another network by using a controller, to implement networkwide cooperative defense of network devices, thereby enhancing network security, reducing a load of the controller, and improving processing performance of the controller.

The following describes in detail the technical solutions of the present disclosure with reference to several specific embodiments.

Figure 1:
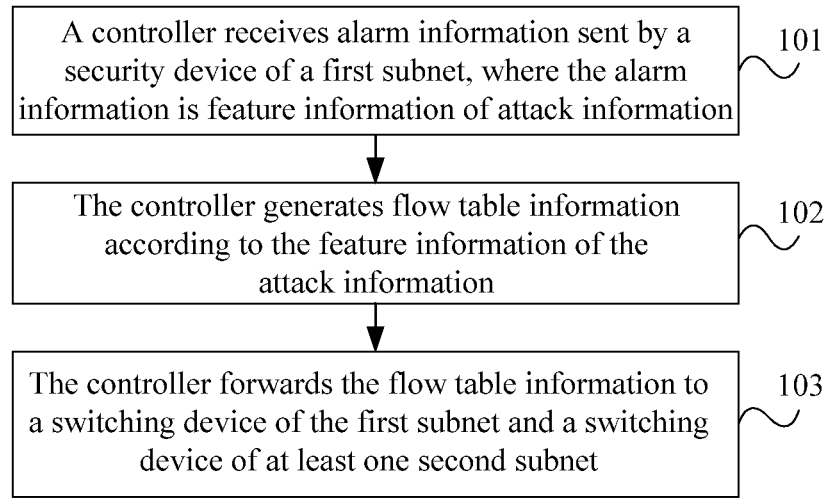
FIG. 1 is a schematic flowchart of an embodiment of a method for cooperative defense on a network according to the present disclosure.

FIG. 1 is a schematic flowchart of Embodiment 1 of a method for cooperative defense on a network according to the present disclosure. The network in the embodiment shown in FIG. 1 includes a controller, a first subnet, and at least one second subnet, and the controller may control the first subnet and the at least one second subnet. The first subnet refers to a subnet that is being attacked, and the second subnet refers to another subnet that is connected to the controller controlling the first subnet. A deep packet inspection (Deep Packet Inspection, hereinafter referred to as DPI) device is deployed on the subnet that is being attacked, where the DPI device may be a network security device such as an intrusion detection system (Intrusion Detection System, hereinafter referred to as IDS) or an intrusion prevention system (Intrusion Prevention System, hereinafter referred to as IPS). This embodiment is executed by a controller in an SDN. As shown in FIG. 1, the method in this embodiment is as follows:

In FIG. 1, block S101 the controller receives alarm information sent by a security device of the first subnet, where the alarm information is feature information of attack information.

The first subnet is a subnet that is being attacked. If the security device of the first subnet receives a data flow and learns, by means of DPI detection analysis, that the corresponding data flow is attack information, the security device of the first subnet generates alarm information and sends the alarm information to the controller, where the alarm information may be feature information of the attack information.

In FIG. 1, block S102 the controller generates flow table information according to the feature information of the attack information.

This means that, the data flow corresponding to the flow table information belongs to the attack information, and a switching device needs to prevent the data flow from entering the corresponding subnet.

In FIG. 1, block S103 the controller forwards the flow table information to the switching device of the first subnet and a switching device of the at least one second subnet.

Specifically, the controller forwards the flow table information to the switching device of the first subnet and the switching device of the at least one second subnet, so that the switching device of the first subnet and the switching device of the at least one second subnet filter, according to the flow table information, a data flow that enters a corresponding subnet, to implement networkwide cooperative defense of network devices.

In this embodiment, alarm information sent by a security device of a first subnet that is being attacked is received by a controller, where the alarm information is feature information of attack information; the controller generates flow table information according to the feature information of the attack information, and forwards the flow table information to a switching device of the first subnet and a switching device of at least one second subnet, which is equivalent to that, after detecting an attack, a security device of a subnet generates alarm information, and shares, by using the controller, the alarm information with a switching device of the subnet and a switching device of another subnet that is not being attacked, to form networkwide cooperative defense, thereby enhancing network security. The controller only shares the alarm information, and does not need to process a data flow that enters the network, thereby improving processing performance of the controller.

Figure 2:
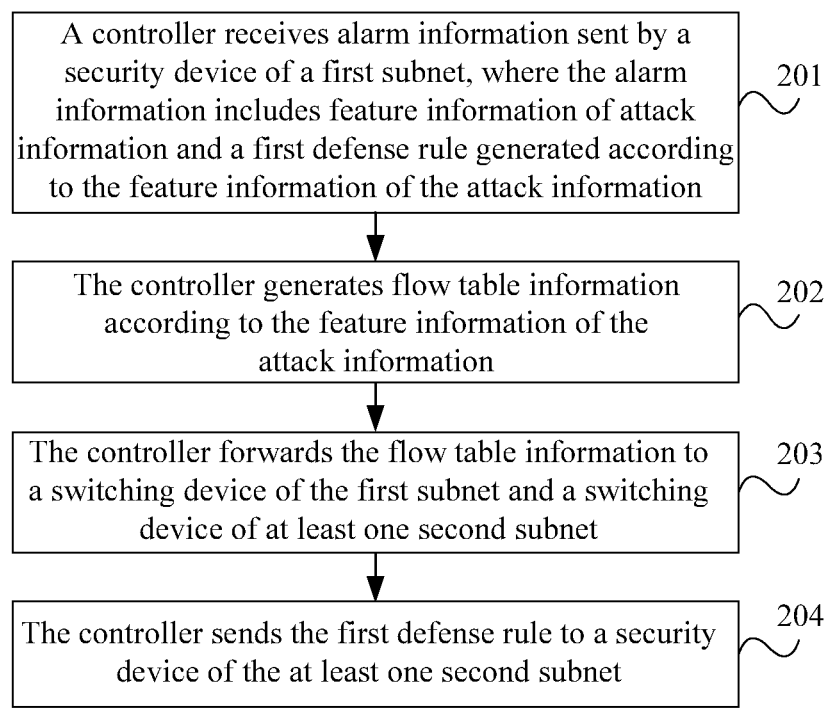
FIG. 2 is a schematic flowchart of an embodiment of a method for cooperative defense on a network according to the present disclosure.

FIG. 2 is a schematic flowchart of Embodiment 2 of a method for cooperative defense on a network according to the present disclosure. The embodiment shown in FIG. 2 differs from that shown in FIG. 1 in that, in an application scenario of the embodiment shown in FIG. 2, a DPI device also needs to be deployed in a second subnet. Specifically, the DPI device is deployed between a switching device and a subnet, that is, a data flow first passes through the switching device, and then passes through the DPI device to enter each subnet, where the DPI device may be a network security device such as an IDS or an IPS. This embodiment is executed by a controller in an SDN. As shown in FIG. 2, the method in this embodiment is as follows:

In FIG. 2, block S201 The controller receives alarm information sent by a security device of a first subnet, where the alarm information includes feature information of attack information and a first defense rule generated according to the feature information of the attack information.

The first subnet is a subnet that is being attacked. If the security device of the first subnet receives a data flow and learns, by means of DPI detection analysis, that the corresponding data flow is attack information, the security device of the first subnet generates alarm information and sends the alarm information to the controller, where the alarm information may be feature information of the attack information. The security device of the first subnet generates a first defense rule according to the feature information of the attack information, where the first defense rule is an access rule for an external network to access the first subnet, and the security device may further perform, according to the first defense rule, filtering on a data flow that passes through a network device.

The first defense rule may include: (reporting an alarm on a data packet/recording a data packet/allowing a data packet to pass), where the data packet may be a data packet that comes from an external network (EXTERNAL NET), a data packet with a specified source or destination Internet Protocol (Internet Protocol, hereinafter referred to as IP) address, or a data packet with a specified source or destination Transmission Control Protocol (Transmission Control Protocol, TCP for short), User Datagram Protocol (User Datagram Protocol, UDP for short), or Internet Control Message Protocol (Internet Control Message Protocol, hereinafter referred to as ICMP) address; or the first defense rule may include specifying a field in a packet, for example, a data packet in which the 0th bit to the seventh bit of a payload includes a content (such as $MyINFO).

For example:

```
alert tcp $HOME_NET any -> $EXTERNAL_NET any
(msg:"BLEEDING-EDGE P2P Direct Connect Traffic (client-server)";
    flow:from_client,established; content:"$MyINFO"; offset:0; depth:7;
    classtype:policy-violation;
reference:url,en.wikipedia.org/wiki/Direct_connect_file-sharing_application; sid:2002814;
rev:1;)
```

Note: The first defense rule is detecting the TCP protocol, which includes: a connection from a to-be-protected local network to an external network; any port to any port, that is, any to any; direction: flow: from_client; matching starting from the $0^{th}$ bit in the payload, a length is 7, and whether "$MyINFO" exists.

In FIG. 2, block S202 the controller generates flow table information according to the feature information of the attack information.

This step is similar to S102. Reference may be made to detailed description in S102, and details are not described herein again.

In FIG. 2, block S203 the controller forwards the flow table information to a switching device of the first subnet and a switching device of the at least one second subnet.

This step is similar to S103. Reference may be made to detailed description in S103, and details are not described herein again.

In FIG. 2, block S204 the controller sends the first defense rule to a security device of the at least one second subnet.

The security device of the at least one subnet may further perform, according to the first defense rule, filtering on a data flow sent by the switching device of the second subnet, to further enhance network security.

Step S204 may occur before S202, or S204 and S202 may occur at the same time, that is, a sequence of sending to the switching device of the second subnet and sending to the security device of the second subnet is not limited.

Based on the technical solution in the embodiment shown in FIG. 1, the technical solution in this embodiment is to further share, by using the controller, the first defense rule generated by the security device of the first subnet with the security device of the second subnet that is connected to the controller, so that the security device of the second subnet further performs filtering on a data flow, thereby further enhancing network security.

Figure 3:
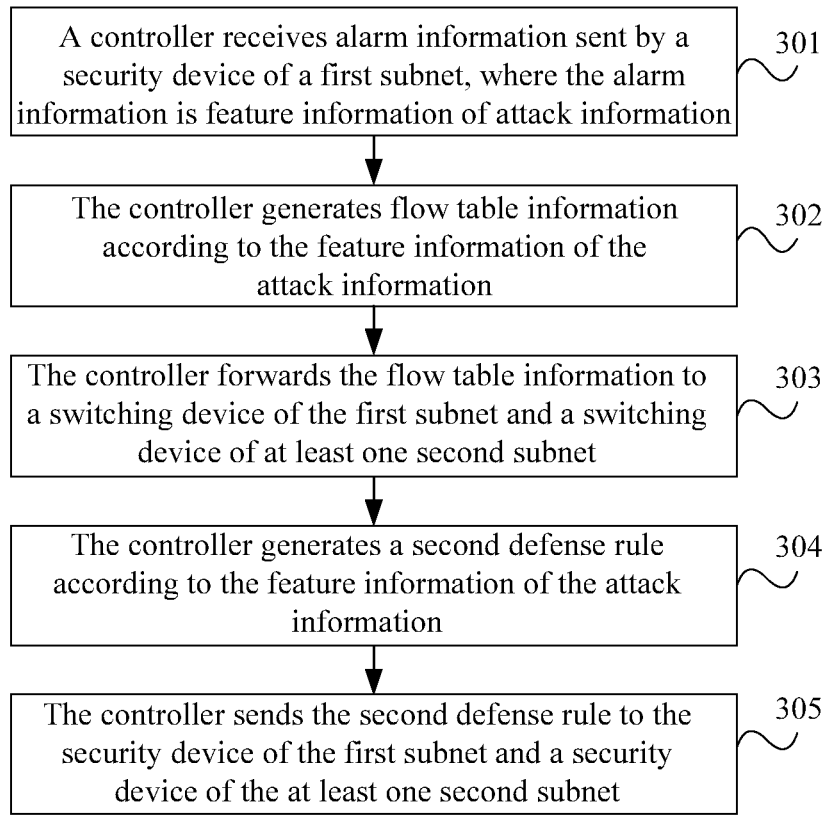
FIG. 3 is a schematic flowchart of an embodiment of a method for cooperative defense on a network according to the present disclosure.

FIG. 3 is a schematic flowchart of Embodiment 3 of a method for cooperative defense on a network according to the present disclosure. An application scenario in FIG. 3 is the same as that shown in FIG. 2, and the technical solution in FIG. 3 differs from that in FIG. 2 in that the first defense rule in the embodiment shown in FIG. 2 is generated by the security device of the first subnet while a second defense rule in the embodiment shown in FIG. 3 is generated by a controller according to feature information of attack information that is reported by a security device of a first subnet. The first defense rule may be the same as the second defense rule. As shown in FIG. 3, the method in this embodiment includes:

In FIG. 3, block S301, the controller receives alarm information sent by the security device of the first subnet, where the alarm information is the feature information of the attack information.

This step is similar to S101 in FIG. 1. Reference may be made to detailed description in S101, and details are not described herein again.

In FIG. 3, block S302 the controller generates flow table information according to the feature information of the attack information.

This step is similar to S102 in FIG. 1. Reference may be made to detailed description in S102, and details are not described herein again.

In FIG. 3, block S303 the controller forwards the flow table information to a switching device of the first subnet and a switching device of at least one second subnet.

This step is similar to S103 in FIG. 1. Reference may be made to detailed description in S103, and details are not described herein again.

In FIG. 3, block S304 the controller generates the second defense rule according to the feature information of the attack information.

The second defense rule refers to an access rule for an external network to access the first subnet or the second subnet, where the second defense rule is the same as the first defense rule, and "the first" and "the second" are used herein only to differentiate between execution bodies that generate the defense rules.

In FIG. 3, block S305 the controller sends the second defense rule to the security device of the first subnet and a security device of the at least one second subnet.

The security device of the first subnet and the security device of the second subnet further perform filtering on a data flow according to the second defense rule, to enhance network security.

A sequence of S304 and S305 and other steps is not limited, as long as S304 and S305 are performed after S301.

Technical effects of this embodiment and those of the embodiment shown in FIG. 2 are similar, and details are not described herein again.

Figure 4:
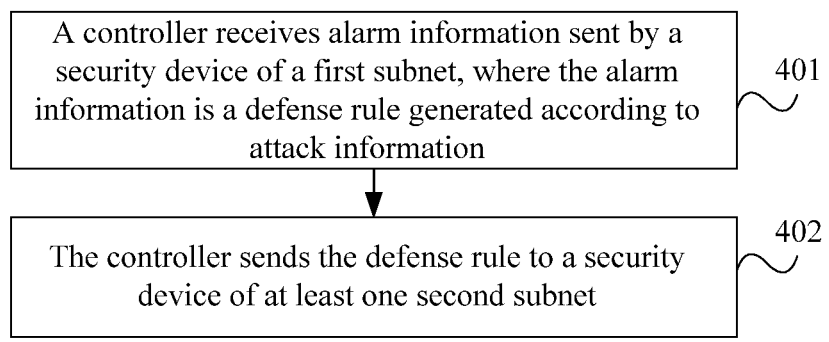
FIG. 4 is a schematic flowchart of an embodiment of a method for cooperative defense on a network according to the present disclosure.

FIG. 4 is a schematic flowchart of Embodiment 4 of a method for cooperative defense on a network according to the present disclosure. In the embodiment shown in FIG. 4, a DPI device needs to be deployed in a first subnet and a second subnet each, where the DPI device may be a network security device such as an IDS or an IPS. This embodiment is executed by a controller. As shown in FIG. 4, the method in this embodiment is as follows:

In FIG. 4, block S401. The controller receives alarm information sent by a security device of the first subnet, where the alarm information is a defense rule generated according to attack information.

The defense rule refers to an access rule for an external network to access the first subnet.

Figure 5:
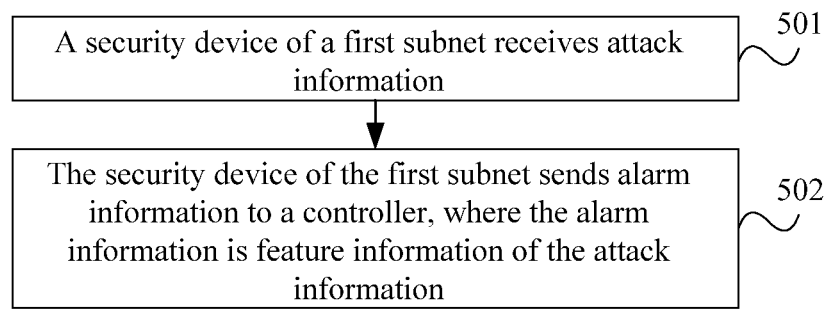
FIG. 5 is a schematic flowchart of an embodiment of a method for cooperative defense on a network according to the present disclosure.

In FIG. 5, block S402. The controller sends the defense rule to a security device of the at least one second subnet.

The security device of the at least one second subnet performs filtering on a data flow according to the defense rule.

In this embodiment, the security device can perform precise filtering on the data flow by using the defense rule; therefore, in a scenario in which a security device is deployed in each subnet, the defense rule may be shared, by using the controller, with a security device of another subnet that is connected to the controller. This can also implement networkwide cooperative defense of network devices, thereby enhancing network security, reducing a load of the controller, and improving processing performance of the controller.

It can be understood that, an alternative solution is that the controller receives feature information of attack information that is sent by the security device of the first subnet, the controller generates a defense rule according to the feature information of the attack information, and shares the defense rule with the security device of the first subnet and the security device of the at least one second subnet. Implementation principles and technical effects of the solution are similar to those of the embodiment shown in FIG. 4, and details are not described herein again.

FIG. 5 is a schematic flowchart of Embodiment 5 of a method for cooperative defense on a network according to the present disclosure. An application scenario in the embodiment shown in FIG. 5 is the same as that in the embodiment shown in FIG. 1, and the embodiment shown in FIG. 5 differs from the embodiment shown in FIG. 1 in that the embodiment shown in FIG. 1 is executed by a controller while the embodiment shown in FIG. 5 is executed by a security device of a first subnet, that is, a security device of a network that is being attacked. As shown in FIG. 5, the method in this embodiment includes:

In FIG. 5, block S501 the security device of the first subnet receives attack information.

In FIG. 5, block S502 the security device of the first subnet sends alarm information to a controller, where the alarm information is feature information of the attack information.

If the security device of the first subnet determines, by means of DPI analysis, that a received data flow is attack information, the security device of the first subnet generates alarm information, where the alarm information includes feature information of the attack information, and sends the alarm information to the controller, so that controller generates flow table information according to the alarm information, and forwards the flow table information to a switching device of another subnet (a second subnet), to implement networkwide cooperative defense of network devices.

In this embodiment, a security device of a first subnet sends alarm information to a controller, where the alarm information is feature information of attack information, so that the controller generates flow table information according to the alarm information, and forwards the flow table information to a switching device of another subnet (a second subnet), to implement networkwide cooperative defense of network devices. This is equivalent to that, after detecting an attack, a security device of a subnet generates alarm information, and shares, by using the controller, the alarm information with a switching device of the subnet and a switching device of another subnet that is not being attacked, to form networkwide cooperative defense, thereby enhancing network security. The controller only shares the alarm information, and does not need to process a data flow that enters a network, thereby improving processing performance of the controller.

Based on the foregoing embodiment, the alarm information further includes a first defense rule generated according to the attack information, so that the controller generates the flow table information according to the alarm information, forwards the flow table information to a switching device of another subnet (the second subnet), and sends the first defense rule to a security device of the second subnet, so that the security device of the second subnet further performs filtering on a data flow according to the first defense rule, thereby further enhancing network security. The application scenario in this embodiment is the same as that in the embodiment shown in FIG. 2.

Figure 6:
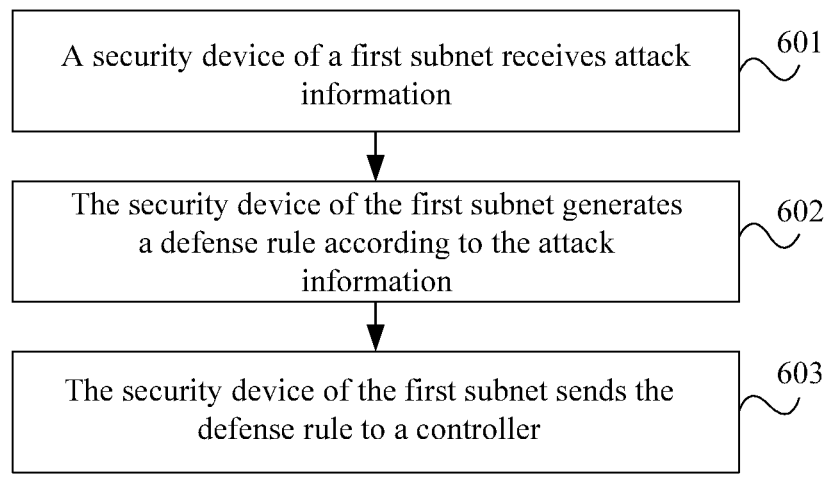
FIG. 6 is a schematic flowchart of an embodiment of a method for cooperative defense on a network according to the present disclosure.

FIG. 6 is a schematic flowchart of Embodiment 6 of a method for cooperative defense on a network according to the present disclosure. The embodiment shown in FIG. 6 differs from the embodiment shown in FIG. 4 in that the embodiment shown in FIG. 4 is executed by a controller while the embodiment shown in FIG. 6 is executed by a security device of a first subnet. As shown in FIG. 6, the method in this embodiment includes:

In FIG. 6, block S601 the security device of the first subnet receives attack information.

In FIG. 6, block S602 the security device of the first subnet generates a defense rule according to the attack information.

The defense rule refers to an access rule for an external network to access the first subnet.

In FIG. 6, block S603 the security device of the first subnet sends the defense rule to a controller.

After receiving the defense rule, the controller sends the defense rule to a security device of at least one second subnet, so that the security device of the at least one second subnet performs filtering on a data flow according to the defense rule.

In this embodiment, the security device can perform precise filtering on the data flow by using the defense rule; therefore, in a scenario in which a security device is deployed in each subnet, the defense rule may be shared, by using the controller, with a security device of another subnet that is connected to the controller. This can also implement networkwide cooperative defense of network devices, thereby enhancing network security, reducing a load of the controller, and improving processing performance of the controller.

Figure 7:
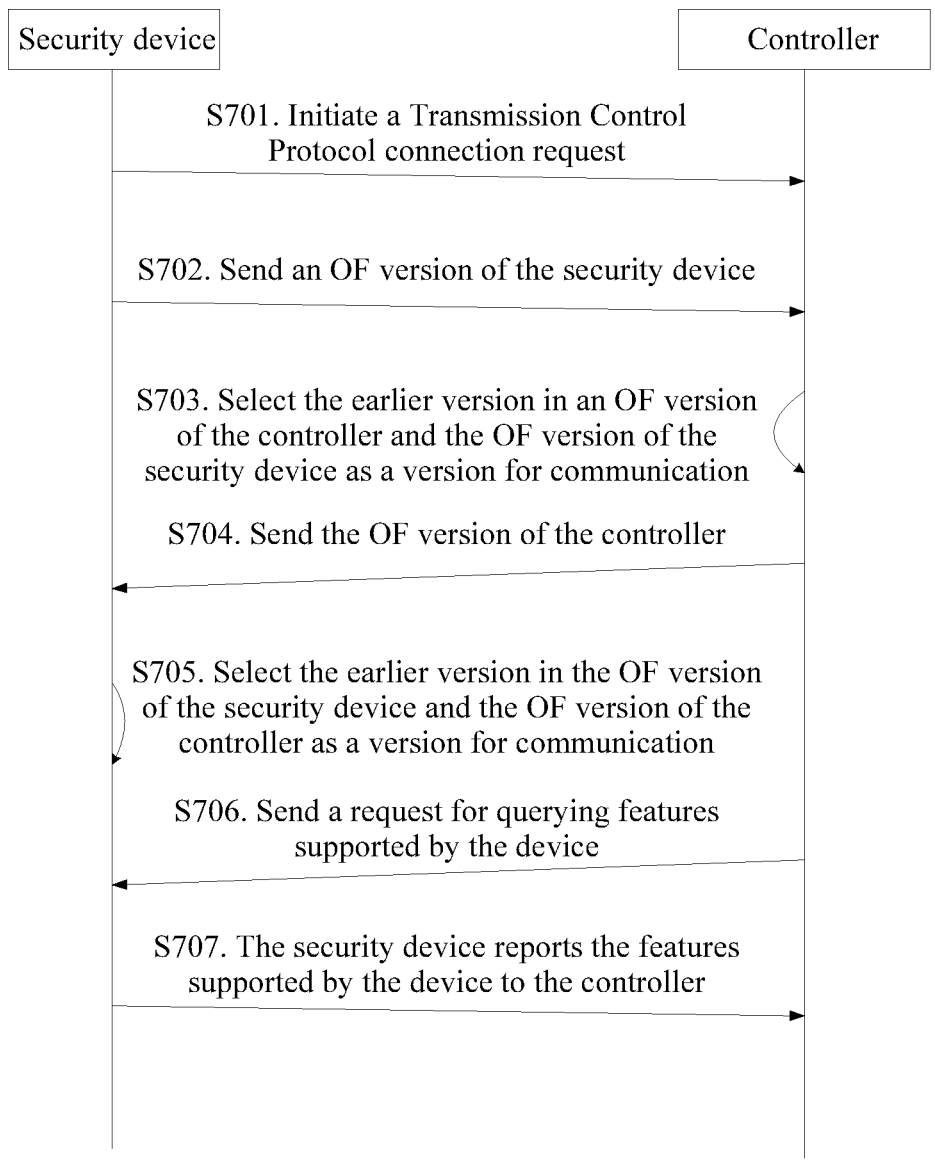
FIG. 7 is a signaling diagram for establishing a connection in a method for cooperative defense on a network according to an embodiment of the present disclosure.

In the foregoing embodiments, before the security device of the first subnet communicates with the controller and the controller communicates with the security device of the second subnet or the security device of the first subnet, the following is further included: a process of establishing a connection between the security device of the first subnet and the controller, and a process of establishing a connection between the security device of the second subnet and the controller. The two processes are the same; therefore, whether a security device is the security device of the first subnet or the security device of the second subnet is not limited in the following, and the two processes are collectively referred to as a process of establishing a connection between a security device and the controller. Specifically, as shown in FIG. 7, FIG. 7 is a signaling diagram for establishing a connection in a method for cooperative defense on a network according to of the present disclosure. The method in this embodiment includes:

In FIG. 7, block S701 a security device initiates a Transmission Control Protocol (Transmission Control Protocol, hereinafter referred to as TCP) connection request to a controller.

In FIG. 7, block S702 the security device sends an OpenFlow protocol (OpenFlow, hereinafter referred to as OF) version of the security device to the controller.

In FIG. 7, block S703 the controller selects the earlier version in an OF version of the controller and the OF version of the security device as a version for communication.

In FIG. 7, block S704 the controller sends the OF version of the controller to the security device.

In FIG. 7, block S705 the security device selects the earlier version in the OF version of the security device and the OF version of the controller as a version for communication.

In FIG. 7, block S706 the controller sends, to the security device, a request for querying features supported by the device.

In FIG. 7, block S707 the security device reports the features supported by the device to the controller.

After the foregoing steps S701 to S707 are performed, a communication connection between the controller and the security device is completed.

It is noteworthy that, in the foregoing embodiments, an SDN network runs based on the Openflow protocol, and a switching device in the SDN network may specifically refer to an Openflow protocol-based switch, and a controller in the SDN network may be specifically an Openflow protocol-based controller. Certainly, it can be understood that, the technical solution of this embodiment may be also applied in an SDN network based on another protocol, and implementation principles and technical effects thereof are similar, and are not described again in the present disclosure.

Figure 8:
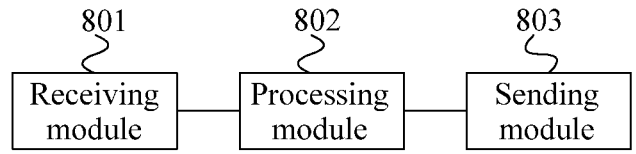
FIG. 8 is a schematic structural diagram of an embodiment of an apparatus for cooperative defense on a network according to the present disclosure.

FIG. 8 is a schematic structural diagram of Embodiment 1 of an apparatus for cooperative defense on a network according to the present disclosure. The apparatus in this embodiment may be deployed in a controller, the network in this embodiment includes a controller, a first subnet, and at least one second subnet, and the controller controls the first subnet and the at least one second subnet. The apparatus in this embodiment includes a receiving module 801, a processing module 802, and a sending module 803, where the receiving module 801 is configured to receive alarm information sent by a security device of the first subnet, where the first subnet is a subnet that is being attacked, and the alarm information is feature information of attack information; the processing module 802 is configured to generate flow table information according to the feature information of the attack information; and the sending module 803 is configured to forward the flow table information to a switching device of the first subnet and a switching device of the at least one second subnet, so that the switching device of the first subnet and the switching device of the at least one second subnet perform filtering on a data flow according to the flow table information.

The apparatus in this embodiment may be used to execute the technical solution in the method embodiment shown in FIG. 1, and implementation principles and technical effects thereof are similar and are not described herein again.

In the foregoing embodiment, the alarm information further includes a first defense rule generated by the security device of the first subnet according to the attack information, where the first defense rule is an access rule for an external network to access the first subnet; the sending module 803 is further configured to: after the alarm information sent by the security device of the first subnet is received, send the first defense rule to a security device of the at least one second subnet, so that the security device of the at least one second subnet performs, according to the first defense rule, filtering on a data flow that accesses the second subnet.

The apparatus in this embodiment may be used to execute the technical solution in the method embodiment shown in FIG. 2, and implementation principles and technical effects thereof are similar and are not described herein again.

In the foregoing embodiment, the processing module 802 is further configured to: after the receiving module 801 receives the alarm information sent by the security device of the first subnet, generate a second defense rule according to the feature information of the attack information, where the second defense rule is an access rule for an external network to access the first subnet or the second subnet; the sending module 803 is further configured to send the second defense rule to the security device of the first subnet and the security device of the at least one second subnet, so that the security device of the at least one second subnet performs filtering on a data flow according to the second defense rule.

The apparatus in this embodiment may be used to execute the technical solution in the method embodiment shown in FIG. 3, and implementation principles and technical effects thereof are similar and are not described herein again.

In the foregoing embodiment, the processing module 802 is further configured to: before the receiving module 801 receives the alarm information sent by the security device of the first subnet, establish a communication connection with the security device of the first subnet.

In the foregoing embodiment, the processing module 802 is further configured to: before the receiving module 801 receives the alarm information sent by the security device of the first subnet, establish a communication connection with the security device of the first subnet and the security device of the at least one second subnet.

The apparatus in this embodiment may be used to execute the technical solution in the method embodiment shown in FIG. 7, and implementation principles and technical effects thereof are similar and are not described herein again.

Figure 9:
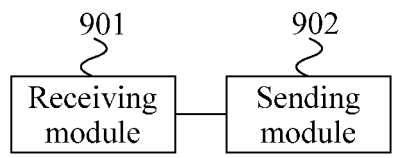
FIG. 9 is a schematic structural diagram of an embodiment of an apparatus for cooperative defense on a network according to the present disclosure.

FIG. 9 is a schematic structural diagram of Embodiment 2 of an apparatus for cooperative defense on a network according to the present disclosure. As shown in FIG. 9, the network in this embodiment includes a controller, a first subnet, and at least one second subnet, and the controller controls the first subnet and the at least one second subnet. The apparatus in this embodiment includes a receiving module 901 and a sending module 902, where the receiving module 901 is configured to receive attack information, and the sending module 902 is configured to send alarm information to the controller, where the alarm information is feature information of the attack information.

In the foregoing embodiment, the alarm information further includes a first defense rule generated according to the attack information, and the first defense rule is an access rule for an external network to access the first subnet.

The apparatus in this embodiment may be used to execute the technical solution in the method embodiment shown in FIG. 5, and implementation principles and technical effects thereof are similar and are not described herein again.

In the foregoing embodiment, the apparatus further includes a processing module, configured to: before the alarm information is sent to the controller, establish a communication connection with the controller.

The apparatus in this embodiment may be used to execute the technical solution in the method embodiment shown in FIG. 7, and implementation principles and technical effects thereof are similar and are not described herein again.

Figure 10:
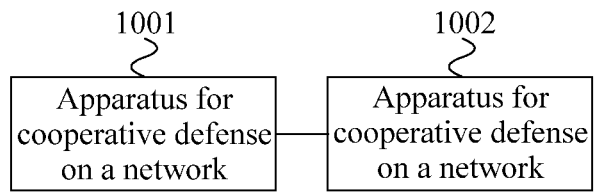
FIG. 10 is a schematic structural diagram of an embodiment of a system for cooperative defense on a network according to the present disclosure.

FIG. 10 is a schematic structural diagram of Embodiment 1 of a system for cooperative defense on a network. As shown in FIG. 10, the system in this embodiment includes: an apparatus 1001 for cooperative defense on a network and an apparatus 1002 for cooperative defense on a network, where the apparatus 1001 for cooperative defense on a network is configured to execute functions of the modules in the apparatus for cooperative defense on a network shown in FIG. 8, and the apparatus 1002 for cooperative defense on a network is configured to execute functions of the modules in the apparatus for cooperative defense on a network shown in FIG. 9. Implementation principles and technical effects thereof are similar, and are not described herein again.

Figure 11:
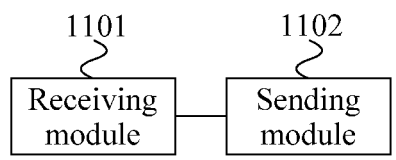
FIG. 11 is a schematic structural diagram of an embodiment of an apparatus for cooperative defense on a network according to the present disclosure.

FIG. 11 is a schematic structural diagram of Embodiment 3 of an apparatus for cooperative defense on a network according to the present disclosure. As shown in FIG. 11, the network in this embodiment includes a controller, a first subnet, and at least one second subnet, and the controller controls the first subnet and the at least one second subnet. The apparatus in this embodiment includes a receiving module 1101 and a sending module 1102, where the receiving module 1101 is configured to receive alarm information sent by a security device of the first subnet, where the first subnet is a subnet that is being attacked, the alarm information is a defense rule generated according to attack information, and the defense rule is an access rule for an external network to access the first subnet; and the sending module 1102 is configured to send the defense rule to a security device of the at least one second subnet, so that the security device of the at least one second subnet performs filtering on a data flow according to the defense rule.

The apparatus in this embodiment may be used to execute the technical solution in the method embodiment shown in FIG. 4, and implementation principles and technical effects thereof are similar and are not described herein again.

Figure 12:
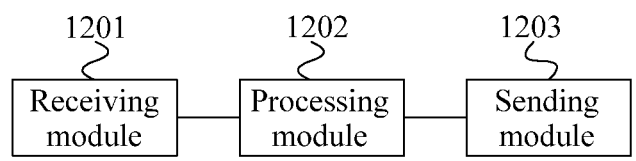
FIG. 12 is a schematic structural diagram of an embodiment of an apparatus for cooperative defense on a network according to the present disclosure.

FIG. 12 is a schematic structural diagram of Embodiment 4 of an apparatus for cooperative defense on a network according to the present disclosure. As shown in FIG. 12, the network in this embodiment includes a controller, a first subnet, and at least one second subnet, and the controller controls the first subnet and the at least one second subnet. The apparatus in this embodiment includes a receiving module 1201, a processing module 1202, and a sending module 1203, where the receiving module 1201 is configured to receive attack information, the processing module 1202 is configured to generate a defense rule according to the attack information, where the defense rule is an access rule for an external network to access the first subnet, and the sending module 1203 is configured to send the defense rule to the controller, so that the controller sends the defense rule to a security device of the at least one second subnet.

The apparatus in this embodiment may be used to execute the technical solution in the method embodiment shown in FIG. 6, and implementation principles and technical effects thereof are similar and are not described herein again.

Figure 13:
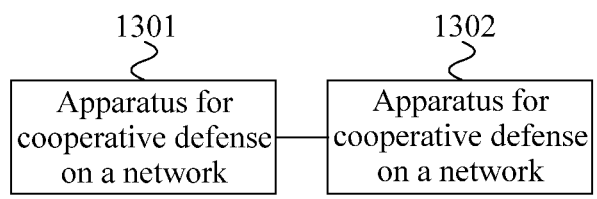
FIG. 13 is a schematic structural diagram of an embodiment of a system for cooperative defense on a network according to the present disclosure.

FIG. 13 is a schematic structural diagram of Embodiment 2 of a system for cooperative defense on a network. As shown in FIG. 13, the system in this embodiment includes: an apparatus 1301 for cooperative defense on a network and an apparatus 1302 for cooperative defense on a network, where the apparatus 1301 for cooperative defense on a network is configured to execute functions of the modules in the apparatus for cooperative defense on a network shown in FIG. 11, and the apparatus 1302 for cooperative defense on a network is configured to execute functions of the modules in the apparatus for cooperative defense on a network shown in FIG. 12. Implementation principles and technical effects thereof are similar, and are not described herein again.

Figure 14:
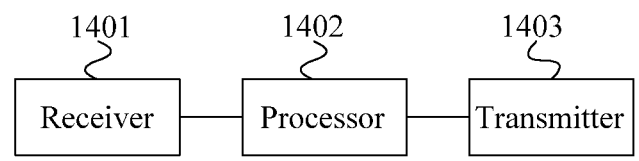
FIG. 14 is a schematic structural diagram of an embodiment of an apparatus for cooperative defense on a network according to the present disclosure.

FIG. 14 is a schematic structural diagram of Embodiment 5 of an apparatus for cooperative defense on a network according to the present disclosure. The apparatus in this embodiment may be deployed in a controller, the network in this embodiment includes a controller, a first subnet, and at least one second subnet, and the controller controls the first subnet and the at least one second subnet. The apparatus in this embodiment includes a receiver 1401, a processor 1402, and a transmitter 1403, where the receiver 1401 is configured to receive alarm information sent by a security device of the first subnet, where the first subnet is a subnet that is being attacked, and the alarm information is feature information of attack information; the processor 1402 is configured to generate flow table information according to the feature information of the attack information; and the transmitter 1403 is configured to forward the flow table information to a switching device of the first subnet and a switching device of the at least one second subnet, so that the switching device of the first subnet and the switching device of the at least one second subnet perform filtering on a data flow according to the flow table information.

The apparatus in this embodiment may be used to execute the technical solution in the method embodiment shown in FIG. 1, and implementation principles and technical effects thereof are similar and are not described herein again.

In the foregoing embodiment, the alarm information further includes a first defense rule generated by the security device of the first subnet according to the attack information, where the first defense rule is an access rule for an external network to access the first subnet; the transmitter 1403 is further configured to: after the alarm information sent by the security device of the first subnet is received, send the first defense rule to a security device of the at least one second subnet, so that the security device of the at least one second subnet performs, according to the first defense rule, filtering on a data flow that accesses the second subnet.

The apparatus in this embodiment may be used to execute the technical solution in the method embodiment shown in FIG. 2, and implementation principles and technical effects thereof are similar and are not described herein again.

In the foregoing embodiment, the processor 1402 is further configured to: after the receiver 1401 receives the alarm information sent by the security device of the first subnet, generate a second defense rule according to the feature information of the attack information, where the second defense rule is an access rule for an external network to access the first subnet or the second subnet; the transmitter 1403 is further configured to send the second defense rule to the security device of the first subnet and the security device of the at least one second subnet, so that the security device of the at least one second subnet performs filtering on a data flow according to the second defense rule.

The apparatus in this embodiment may be used to execute the technical solution in the method embodiment shown in FIG. 3, and implementation principles and technical effects thereof are similar and are not described herein again.

In the foregoing embodiment, the processor 1402 is further configured to: before the receiver 1401 receives the alarm information sent by the security device of the first subnet, establish a communication connection with the security device of the first subnet.

In the foregoing embodiment, the processor 1402 is further configured to: before the receiver 1401 receives the alarm information sent by the security device of the first subnet, establish a communication connection with the security device of the first subnet and the security device of the at least one second subnet.

The apparatus in this embodiment may be used to execute the technical solution in the method embodiment shown in FIG. 7, and implementation principles and technical effects thereof are similar and are not described herein again.

Figure 15:
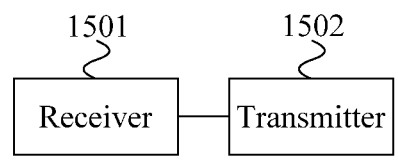
FIG. 15 is a schematic structural diagram of an embodiment of an apparatus for cooperative defense on a network according to the present disclosure.

FIG. 15 is a schematic structural diagram of Embodiment 6 of an apparatus for cooperative defense on a network according to the present disclosure. As shown in FIG. 15, the network in this embodiment includes a controller, a first subnet, and at least one second subnet, and the controller controls the first subnet and the at least one second subnet. The apparatus in this embodiment includes a receiver 1501 and a transmitter 1502, where the receiver 1501 is configured to receive attack information, and the transmitter 1502 is configured to send alarm information to the controller, where the alarm information is feature information of the attack information.

In the foregoing embodiment, the alarm information further includes a first defense rule generated according to the attack information, and the first defense rule is an access rule for an external network to access the first subnet.

The apparatus in this embodiment may be used to execute the technical solution in the method embodiment shown in FIG. 5, and implementation principles and technical effects thereof are similar and are not described herein again.

In the foregoing embodiment, the apparatus further includes a processor, configured to: before the alarm information is sent to the controller, establish a communication connection with the controller.

The apparatus in this embodiment may be used to execute the technical solution in the method embodiment shown in FIG. 7, and implementation principles and technical effects thereof are similar and are not described herein again.

Figure 16:
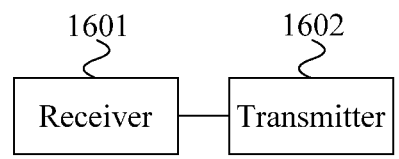
FIG. 16 is a schematic structural diagram of an embodiment of an apparatus for cooperative defense on a network according to the present disclosure.

FIG. 16 is a schematic structural diagram of Embodiment 7 of an apparatus for cooperative defense on a network according to the present disclosure. As shown in FIG. 16, the network in this embodiment includes a controller, a first subnet, and at least one second subnet, and the controller controls the first subnet and the at least one second subnet. The apparatus in this embodiment includes a receiver 1601 and a transmitter 1602, where the receiver 1601 is configured to receive alarm information sent by a security device of the first subnet, where the first subnet is a subnet that is being attacked, the alarm information is a defense rule generated according to attack information, and the defense rule is an access rule for an external network to access the first subnet; and the transmitter 1602 is configured to send the defense rule to a security device of the at least one second subnet, so that the security device of the at least one second subnet performs filtering on a data flow according to the defense rule.

The apparatus in this embodiment may be used to execute the technical solution in the method embodiment shown in FIG. 4, and implementation principles and technical effects thereof are similar and are not described herein again.

Figure 17:
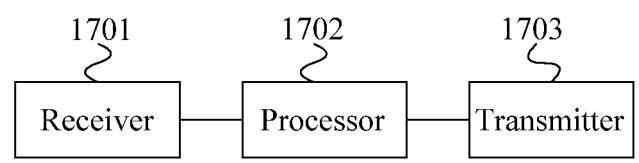
FIG. 17 is a schematic structural diagram of an embodiment of an apparatus for cooperative defense on a network according to the present disclosure.

FIG. 17 is a schematic structural diagram of Embodiment 8 of an apparatus for cooperative defense on a network according to the present disclosure. As shown in FIG. 17, the network in this embodiment includes a controller, a first subnet, and at least one second subnet, and the controller controls the first subnet and the at least one second subnet. The apparatus in this embodiment includes a receiver 1701, a processor 1702, and a transmitter 1703, where the receiver 1701 is configured to receive attack information, the processor 1702 is configured to generate a defense rule according to the attack information, where the defense rule is an access rule for an external network to access the first subnet, and the transmitter 1703 is configured to send the defense rule to the controller, so that the controller sends the defense rule to a security device of the at least one second subnet.

The apparatus in this embodiment may be used to execute the technical solution in the method embodiment shown in FIG. 6, and implementation principles and technical effects thereof are similar and are not described herein again.

In a first aspect of the embodiments of the present disclosure, a method for cooperative defense on a network is disclosed that includes a network with a controller, a first subnet, and at least one second subnet, and the controller controls the first subnet and the at least one second subnet. The method includes receiving, by the controller, alarm information sent by a security device of the first subnet, where the first subnet is a subnet that is being attacked, and the alarm information is feature information of attack information, generating, by the controller according to the feature information of the attack information, flow table information, and forwarding, by the controller, the flow table information to a switching device of the first subnet and a switching device of the at least one second subnet, so that the switching device of the first subnet and the switching device of the at least one second subnet perform filtering on a data flow according to the flow table information.

With reference to the first aspect, in a first possible implementation manner, the alarm information further includes a first defense rule generated by the security device of the first subnet according to the attack information, and the first defense rule is an access rule for an external network to access the first subnet; and after the receiving, by the controller, alarm information sent by a security device of the first subnet, the method further includes: sending, by the controller, the first defense rule to a security device of the at least one second subnet, so that the security device of the at least one second subnet performs, according to the first defense rule, filtering on a data flow that accesses the second subnet.

With reference to the first aspect, in a second possible implementation manner, after the receiving, by the controller, alarm information sent by a security device of the first subnet, the method further includes: generating, by the controller according to the feature information of the attack information, a second defense rule, where the second defense rule is an access rule for an external network to access the first subnet or the second subnet; and sending, by the controller, the second defense rule to the security device of the first subnet and a security device of the at least one second subnet, so that the security device of the at least one second subnet performs filtering on a data flow according to the second defense rule.

A second aspect of the embodiments of the present disclosure provides a method for cooperative defense on a network, including: the network includes a controller, a first subnet, and at least one second subnet, and the controller controls the first subnet and the at least one second subnet; receiving, by a security device of the first subnet, attack information; and sending, by the security device of the first subnet, alarm information to the controller, where the alarm information is feature information of the attack information.

With reference to the second aspect, in a first possible implementation manner, the alarm information further includes a first defense rule generated by the security device of the first subnet according to the attack information, and the first defense rule is an access rule for an external network to access the first subnet.

A third aspect of the embodiments of the present disclosure provides a method for cooperative defense on a network, including: the network includes a controller, a first subnet, and at least one second subnet, and the controller controls the first subnet and the at least one second subnet; receiving, by the controller, alarm information sent by a security device of the first subnet, where the first subnet is a subnet that is being attacked, the alarm information is a defense rule generated according to attack information, and the defense rule is an access rule for an external network to access the first subnet; and sending, by the controller, the defense rule to a security device of the at least one second subnet, so that the security device of the at least one second subnet performs filtering on a data flow according to the defense rule.

A fourth aspect of the embodiments of the present disclosure provides a method for cooperative defense on a network, including: the network includes a controller, a first subnet, and at least one second subnet, and the controller controls the first subnet and the at least one second subnet; receiving, by a security device of the first subnet, attack information; generating, by the security device of the first subnet according to the attack information, a defense rule, where the defense rule is an access rule for an external network to access the first subnet; and sending, by the security device of the first subnet, the defense rule to the controller, so that the controller sends the defense rule to a security device of the at least one second subnet.

A fifth aspect of the embodiments of the present disclosure provides an apparatus for cooperative defense on a network, including: the network includes a controller, a first subnet, and at least one second subnet, and the controller controls the first subnet and the at least one second subnet; a receiving module, configured to receive alarm information sent by a security device of the first subnet, where the first subnet is a subnet that is being attacked, and the alarm information is feature information of attack information; a processing module, configured to generate flow table information according to the feature information of the attack information; and a sending module, configured to forward the flow table information to a switching device of the first subnet and a switching device of the at least one second subnet, so that the switching device of the first subnet and the switching device of the at least one second subnet perform filtering on a data flow according to the flow table information.

With reference to the fifth aspect, in a first possible implementation manner, the alarm information further includes a first defense rule generated by the security device of the first subnet according to the attack information, and the first defense rule is an access rule for an external network to access the first subnet; and the sending module is further configured to: after the alarm information sent by the security device of the first subnet is received, send the first defense rule to a security device of the at least one second subnet, so that the security device of the at least one second subnet performs, according to the first defense rule, filtering on a data flow that accesses the second subnet.

With reference to the fifth aspect, in a second possible implementation manner, the processing module is further configured to: after the receiving module receives the alarm information sent by the security device of the first subnet, generate a second defense rule according to the feature information of the attack information, where the second defense rule is an access rule for an external network to access the first subnet or the second subnet; and the sending module is further configured to send the second defense rule to the security device of the first subnet and a security device of the at least one second subnet, so that the security device of the at least one second subnet performs filtering on a data flow according to the second defense rule.

A sixth aspect of the embodiments of the present disclosure provides an apparatus for cooperative defense on a network, including: the network includes a controller, a first subnet, and at least one second subnet, and the controller controls the first subnet and the at least one second subnet; a receiving module, configured to receive attack information; and a sending module, configured to send alarm information to the controller, where the alarm information is feature information of the attack information.

With reference to the sixth aspect, in a first possible implementation manner, the alarm information further includes a first defense rule generated according to the attack information, and the first defense rule is an access rule for an external network to access the first subnet.

A seventh aspect of the embodiments of the present disclosure provides a system for cooperative defense on a network, including: the apparatus for cooperative defense on a network according to either one of the possible implementation manners of the fifth aspect and the apparatus for cooperative defense on a network according to the first possible implementation manner of the sixth aspect.

An eighth aspect of the embodiments of the present disclosure provides an apparatus for cooperative defense on a network, including: the network includes a controller, a first subnet, and at least one second subnet, and the controller controls the first subnet and the at least one second subnet; a receiving module, configured to receive alarm information sent by a security device of the first subnet, where the first subnet is a subnet that is being attacked, the alarm information is a defense rule generated according to attack information, and the defense rule is an access rule for an external network to access the first subnet; and a sending module, configured to send the defense rule to a security device of the at least one second subnet, so that the security device of the at least one second subnet performs filtering on a data flow according to the defense rule.

A ninth aspect of the embodiments of the present disclosure provides an apparatus for cooperative defense on a network, including: the network includes a controller, a first subnet, and at least one second subnet, and the controller controls the first subnet and the at least one second subnet; a receiving module, configured to receive attack information; a processing module, configured to generate a defense rule according to the attack information, where the defense rule is an access rule for an external network to access the first subnet; and a sending module, configured to send the defense rule to the controller, so that the controller sends the defense rule to a security device of the at least one second subnet.

A tenth aspect of the embodiments of the present disclosure provides a system for cooperative defense on a network, including: the apparatus for cooperative defense on a network according to the eighth aspect and the apparatus for cooperative defense on a network according to the ninth aspect.

According to the method, the apparatus, and the system for cooperative defense on a network that are provided by the embodiments of the present disclosure, alarm information sent by a security device of a first subnet that is being attacked is received by a controller, where the alarm information is feature information of attack information; the controller generates flow table information according to the alarm information, and forwards the flow table information to a switching device of the first subnet and a switching device of at least one second subnet, which is equivalent to that, after detecting an attack, a security device of a subnet generates alarm information, and shares, by using the controller, the alarm information with a switching device of the subnet and a switching device of another subnet that is not being attacked, to form networkwide cooperative defense, thereby enhancing network security. The controller only shares the alarm information, and does not need to process a data flow that enters the network, thereby improving processing performance of the controller.

Persons of ordinary skill in the art may understand that all or some of the steps of the method embodiments may be implemented by a program instructing related hardware. The program may be stored in a computer readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for cooperative defense on a network with an attacked subnet and a second subnet controlled by a controller, the method comprising:
    receiving, by a controller, feature information of an attack information sent by a security device of the attacked subnet;
    generating, by the controller according to the feature information, flow table information, wherein the flow table information indicates the data flow of the attack information; and
    forwarding, by the controller, the flow table information to a switching device of the attacked subnet and a switching device of the second subnet;
    receiving, by the controller, a first defense rule generated by the security device of the attacked subnet according to the attack information, and the first defense rule is an access rule for an external network to access the attacked subnet; and
    sending, by the controller, the first defense rule to a security device of the second subnet, so that the security device of the second subnet performs, according to the first defense rule, filtering on a data flow that accesses the second subnet; and
    generating, by the controller according to the feature information, a second defense rule, wherein the second defense rule is an access rule for an external network to access the attacked subnet or the second subnet; and
    sending, by the controller, the second defense rule to the security device of the attacked subnet and a security device of the second subnet, so that the security device of the attacked and the security device of the second subnet performs filtering on a data flow according to the second defense rule.

2. The method of claim 1, further comprising rejecting, by the switching device of the attacked subnet and the switching device of the second subnet, a data that matches the flow table information.

3. A method for cooperative defense on a network, the network comprises a controller, a first subnet, and a second subnet, and the controller controls the first subnet and the second subnet, the method comprises:
    receiving, by a security device of the first subnet, attack information;
    generating, by the security device of the first subnet according to the attack information, a first defense rule, wherein the first defense rule is an access rule for an external network to access the first subnet; and
    sending, by the security device of the first subnet, alarm information to the controller, wherein the alarm information comprises feature information of the attack information and the first defense rule;
    receiving, by the controller, a first defense rule generated by the security device of the attacked subnet according to the attack information, and the first defense rule is an access rule for an external network to access the attacked subnet; and
    sending, by the controller, the first defense rule to a security device of the second subnet, so that the security device of the second subnet performs, according to the first defense rule, filtering on a data flow that accesses the second subnet; and
    generating, by the controller according to the feature information, a second defense rule, wherein the second defense rule is an access rule for an external network to access the attacked subnet or the second subnet; and
    sending, by the controller, the second defense rule to the security device of the attacked subnet and a security device of the second subnet, so that the security device of the attacked and the security device of the second subnet performs filtering on a data flow according to the second defense rule.

4. A method for cooperative defense on a network, further comprising:
    receiving, by the controller, alarm information sent by a security device of a first subnet, wherein the first subnet is a subnet that is being attacked, the alarm information is a defense rule generated by the security device of the first subnet according to attack information, and the defense rule is an access rule for an external network to access the first subnet; and
    sending, by the controller, the defense rule to a security device of the at least one second subnet, so that the security device of the at least one second subnet performs filtering on a data flow according to the defense rule;
    receiving, by the controller, a first defense rule generated by the security device of the attacked subnet according to the attack information, and the first defense rule is an access rule for an external network to access the attacked subnet; and
    sending, by the controller, the first defense rule to a security device of the second subnet, so that the security device of the second subnet performs, according to the first defense rule, filtering on a data flow that accesses the second subnet; and
    generating, by the controller according to the feature information, a second defense rule, wherein the second defense rule is an access rule for an external network to access the attacked subnet or the second subnet; and sending, by the controller, the second defense rule to the security device of the attacked subnet and a security device of the second subnet, so that the security device of the attacked and the security device of the second subnet performs filtering on a data flow according to the second defense rule.

5. A method for cooperative defense on a network, comprising:

receiving, by a security device of a first subnet, attack information;

generating, by the security device of the first subnet according to the attack information, a defense rule, wherein the defense rule is an access rule for an external network to access the first subnet; and sending, by the security device of the first subnet, the defense rule to a controller;

sending, by the controller, the defense rule to a security device of at least one second subnet;

receiving, by the controller, a first defense rule generated by the security device of the attacked subnet according to the attack information, and the first defense rule is an access rule for an external network to access the attacked subnet; and sending, by the controller, the first defense rule to a security device of the second subnet, so that the security device of the second subnet performs, according to the first defense rule, filtering on a data flow that accesses the second subnet; and generating, by the controller according to the feature information, a second defense rule, wherein the second defense rule is an access rule for an external network to access the attacked subnet or the second subnet; and sending, by the controller, the second defense rule to the security device of the attacked subnet and a security device of the second subnet, so that the security device of the attacked and the security device of the second subnet performs filtering on a data flow according to the second defense rule.

6. An apparatus for cooperative defense on a network, comprising:

a receiver, configured to receive alarm information sent by a security device of a first subnet, wherein the first subnet is being attacked, and the alarm information is a feature information of attack information;

a processor, configured to generate flow table information according to the feature information of the attack information, wherein the flow table information indicates the data flow corresponding to the flow table information belongs to the attack information; and a transmitter, configured to forward the flow table information to a switching device of the first subnet and a switching device of at least one second subnet, so that the switching device of the first subnet and the switching device of the at least one second subnet perform filtering on a data flow according to the flow table information;

wherein the alarm information further comprises a first defense rule generated by the security device of the first subnet according to the attack information, and the first defense rule is an access rule for an external network to access the first subnet; and after the alarm information sent by the security device of the first subnet is received, send the first defense rule to a security device of the at least one second subnet, so that the security device of the at least one second subnet performs, according to the first defense rule, filtering on a data flow that accesses the second subnet; and after the receiver receives the alarm information sent by the security device of the first subnet, generate a second defense rule according to the feature information of the attack information, wherein the second defense rule is an access rule for an external network to access the first subnet or the second subnet; and the transmitter is further configured to send the second defense rule to the security device of the first subnet and a security device of the at least one second subnet, so that the security device of the at least one second subnet performs filtering on a data flow according to the second defense rule.

7. An apparatus for cooperative defense on a network, comprising:

a receiver, configured to receive attack information;

a processor, configured to generate a first defense rule according to the attack information, wherein the first defense rule is an access rule for an external network to access the first subnet; and a transmitter, configured to send alarm information to a controller, wherein the alarm information comprises a feature information of the attack information and the first defense rule, wherein the network comprises the controller, the first subnet, and at least one second subnet, and the controller controls the first subnet and the at least one second subnet;

wherein the alarm information further comprises a first defense rule generated by the security device of the first subnet according to the attack information, and the first defense rule is an access rule for an external network to access the first subnet; and after the alarm information sent by the security device of the first subnet is received, send the first defense rule to a security device of the at least one second subnet, so that the security device of the at least one second subnet performs, according to the first defense rule, filtering on a data flow that accesses the second subnet; and after the receiver receives the alarm information sent by the security device of the first subnet, generate a second defense rule according to the feature information of the attack information, wherein the second defense rule is an access rule for an external network to access the first subnet or the second subnet; and the transmitter is further configured to send the second defense rule to the security device of the first subnet and a security device of the at least one second subnet, so that the security device of the at least one second subnet performs filtering on a data flow according to the second defense rule.

8. A system for cooperative defense on a network, comprising: a controller configured to receive alarm information sent by a security device of a first subnet that is being attacked, and the alarm information is feature information of attack information, generate flow table information according to the feature information of the attack information, and forward the flow table information, wherein the flow table information indicates the data flow corresponding to the flow table information belongs to the attack information; and a switching device of the at least one second subnet configured to receive the flow table information, wherein the switching device of the first subnet and the switching device of the at least one second subnet perform filtering on a data flow according to the flow table information;

wherein the alarm information further comprises a first defense rule generated by the security device of the first subnet according to the attack information, and the first defense rule is an access rule for an external network to access the first subnet; and after the alarm information sent by the security device of the first subnet is received, send the first defense rule to a security device of the at least one second subnet, so that the security device of the at least one second subnet performs, according to the first defense rule, filtering on a data flow that accesses the second subnet; and after the receiver receives the alarm information sent by the security device of the first subnet, generate a second defense rule according to the feature information of the attack information, wherein the second defense rule is an access rule for an external network to access the first subnet or the second subnet; and the transmitter is further configured to send the second defense rule to the security device of the first subnet and a security device of the at least one second subnet, so that the security device of the at least one second subnet performs filtering on a data flow according to the second defense rule.

9. A cooperative defense device on a network with an attacked subnet and a second subnet, the apparatus comprising:
a memory storage comprising instructions; and a processor coupled to the memory that reads and executes the instructions to:
receive feature information of an attack information sent by a security device of the attacked subnet,
generate, according to the feature information, flow table information, wherein the flow table information indicates the data flow of the attack information; and
forward the flow table information to a switching device of the attacked subnet and a switching device of the second subnet;
receiving, by the controller, a first defense rule generated by the security device of the attacked subnet according to the attack information, and the first defense rule is an access rule for an external network to access the attacked subnet; and
sending, by the controller, the first defense rule to a security device of the second subnet, so that the security device of the second subnet performs, according to the first defense rule, filtering on a data flow that accesses the second subnet; and
generating, by the controller according to the feature information, a second defense rule, wherein the second defense rule is an access rule for an external network to access the attacked subnet or the second subnet; and
sending, by the controller, the second defense rule to the security device of the attacked subnet and a security device of the second subnet, so that the security device of the attacked and the security device of the second subnet performs filtering on a data flow according to the second defense rule.

10. The apparatus of claim 9, wherein the processor further executes instructions to send to the switching device of the attacked subnet and the switching device of the second subnet, to reject a data that matches the flow table information.

* * * * *